United States Patent [19]
Mito et al.

[11] Patent Number: 5,376,218
[45] Date of Patent: Dec. 27, 1994

[54] DEVICE FOR MANUFACTURING A FILTER

[75] Inventors: Masayuki Mito; Haruo Yuasa, both of Kuga; Masayoshi Iidera, Hiroshima, all of Japan

[73] Assignee: Mitsui Petrochemical Industries, Ltd., Tokyo, Japan

[21] Appl. No.: 198,376

[22] Filed: Feb. 18, 1994

Related U.S. Application Data

[63] Continuation of Ser. No. 932,698, Aug. 20, 1992, abandoned.

[30] Foreign Application Priority Data

Aug. 20, 1991 [JP] Japan .................................. 3-207896

[51] Int. Cl.$^5$ .............................................. B32B 31/16
[52] U.S. Cl. ...................................... 156/474; 156/204; 156/226; 156/290; 156/308.4; 156/499
[58] Field of Search ............... 156/474, 226, 290, 204, 156/469, 499, 309.4; 493/413, 433, 442; 55/521; 210/493.1, 493.5; 264/DIG. 48

[56] References Cited

U.S. PATENT DOCUMENTS

| | | | |
|---|---|---|---|
| 2,141,235 | 12/1938 | Angeletti | 156/474 X |
| 2,493,968 | 1/1950 | Hepner | 156/290 X |
| 2,874,754 | 2/1959 | Yost et al. | 156/204 X |
| 3,306,794 | 2/1967 | Humbert, Jr. | 156/474 X |
| 3,388,536 | 6/1968 | Nash | 55/492 |
| 4,028,252 | 6/1977 | Morris | 210/493.1 X |
| 4,288,278 | 9/1981 | Akao | 156/474 |
| 5,089,202 | 2/1992 | Lippold | 55/521 X |

FOREIGN PATENT DOCUMENTS

| | | | |
|---|---|---|---|
| 2304882 | 8/1974 | Germany | 55/521 |
| 518345 | 2/1940 | United Kingdom | 156/204 |

*Primary Examiner*—Michael W. Ball
*Assistant Examiner*—Michele K. Yoder
*Attorney, Agent, or Firm*—Sherman and Shalloway

[57] ABSTRACT

A filter comprising a composite sheet bent like a pleat and composed of a laminate of at least two monolayer sheets, in which the bent portions are fusion-welded, is provided in order to improve filtering properties while carrying out the composing and pleating processes in one process. A device for manufacturing the filter is also provided. The device comprises, for example: a pair of star-shaped gear type ribbed rolls engaged with each other for heating the composite sheet to temperatures suitable to fusion-weld the same at the front end of the gear while bending the composite sheet like a pleat having a bent width corresponding to the depth or height of the gear; star-shaped gear type bending roll for further bending the heated composite sheet like a pleat; and a pair of heating plates positioned opposed each other at a distance corresponding to the bent width of the pleat. In this device, the composite sheet is selectively and linearly heated and fusion-welded at the bent portions in contact with the front end of the gear while being bent, and it is further bent by the bending roll and then passed through between the heating plates where the composite sheet is heated and fusion-welded at the bent portions from the outer side thereof.

1 Claim, 2 Drawing Sheets

DEVICE FOR MANUFACTURING A FILTER

This application is a continuation, of application Ser. No. 07/932,698, filed Aug. 20, 1992, now abandoned.

BACKGROUND OF THE INVENTION

1. Field of the Invention

This invention relates to a filter for use in cleaning air and collecting or removing dusts contained in the air for filtering and collecting the dusts to separate them from the air.

2. Description of the Prior Art

There are widely used, as a filter, those manufactured by bending a sheet (monolayer sheet) or a composite sheet composed of a laminate of at least two said monolayer sheets in the form of a pleat, which laminating sheet is made of various fiber materials such as same or different natural fibers, synthetic fibers, and glass fibers.

The above filter is designed for filtering and collecting fine dusts contained in the air due to mechanical functions, such as inertia, diffusion, gravity and shut-off by passing the air through the filter in a direction substantially perpendicular to the filter material.

In the case of an electret (dielectric) filter, the filtering and collecting are further due to electrostatic attraction to the dusts. In general, the composite sheet is often used as a filter material.

Various composing techniques are applied for laminating the monolayer sheets with each other. These techniques include, for example, a laminating method with an adhesive, an ultrasonic or a fusion welding method using a thermo-embossing machine or an extreme infrared radiation heater.

With the composite sheet made in a pleat-like shape, it is possible to make a filter having relatively larger area for filtration. In addition, the pleat filter has less air-permeating resistance and can improve dust-collecting capacity and lifetime. On the contrary, a conventional filter material composed of a composite sheet, which is manufactured by laminating monolayer sheets with an ultrasonic or a fusion welding, is fusion-welded over at least a part of the filter material and the welded portion and the adjacent portion thereto are not a fiber-like or has a fiber structure of usually high density, resulting in decreasing the effective filtration area of the filter material and in losing a loft to thereby affect unfavorably on filtering properties such as air-permeating resistance and lifetime. Particularly, the filtering properties of the electret filter are more unfavorably affected by the conventional method since, in the case of composing the monolayer sheets by the fusion welding method to laminate the same, the electric charge of the electret of the filter material is reduced due to the heat of the fusion. The electret charge (the electric charge of the electret) may be extinguished depending on the extent of the heating temperature or heating time or the synergistic effect thereof. For example, the electret charge of a composite sheet composed of a non-woven fabric sheet, which is formed from a normal resin, is substantially extinguished at the welded portion thereof.

In the case of composing the monolayer sheets using an adhesive to laminate the same, the air permeability of the filter is reduced at an adhesive-boned portion, resulting in the deterioration of the filtering properties. Further, in the electret filter, the electret charge is neutralized with the adhesive itself or a solvent contained therein to be reduced or extinguished.

Additionally, the conventional method for manufacturing such filters needs a process for laminating monolayer sheets prior to a process for bending a composite sheet to pleat the same.

SUMMARY OF THE INVENTION

An object of the present invention is to provide a pleat-like filter composed of a composite sheet having an improved filtering capacity compared with the conventional one. Another object of the present invention is to provide a device for manufacturing a pleat-like filter capable of carrying out the bending or pleating process and the composing process in a series of processes to thereby improve a manufacturing efficiency and reduce a manufacturing cost.

A filter according to the present invention comprises a composite sheet bent in the form of a pleat and composed of a laminate of at least two monolayer sheets (for example, resinous fabric sheets) which may be same or different, wherein the bent portions corresponding to both the top portions of mountains and the bottom portions of valleys formed by the pleat of the composite sheet are linearly fusion-welded in a direction of thickness.

A device for manufacturing a pleat-like filter according to the present invention comprises: superimposing and feeding means for superimposing at least two filter material sheets (monolayer sheets) and feeding the superimposed sheets in a predetermined direction; and, heating and bending means positioned on both sides of the fed superimposed sheets for advancing and retreating toward composite sheet to bend the same in the form of a pleat while heating linearly the bent portions of the superimposed sheets in a direction of thickness to fusion-weld said portions to thereby manufacture a filter according to the invention which is a pleat-like composite sheet composed of a laminate of at least two monolayer sheets and fusion welded only at the bent portions, in which the heating and bending means may be, for example, a rod-shaped heater or wedge-shaped heater.

In another aspect, a device for manufacturing a filter according to the invention comprises:
  feeding means for feeding a composite sheet comprised of a laminate of at least two monolayer sheets in a predetermined direction; and
  a pair of star-shaped gear type ribbed rolls for bending the superimposed sheets in the form of a pleat and heating linearly the bent portions of the superimposed sheets in a direction of thickness, positioned on both sides of the fed superimposed sheets so as to be opposed and engaged with each other through the superimposed sheets, the depth or height of the gear portion of said roll being identical to the bent width between one bent portion and the adjacent bent portion thereto and at least the front end of the gear portion of said roll being heated by a heater provided in the roll.

In still another aspect, a device for manufacturing a filter according to the invention comprises: superimposing and feeding means for superimposing at least two monolayer sheets and feeding the superimposed sheets;
  bending means positioned on both sides of the fed superimposed sheets for advancing and retreating toward the superimposed sheets to bend the same in the form of a pleat having a predetermined bent width between one bent portion and the adjacent portion thereto; and a pair of heating means positioned on both sides of the bent superimposed sheets for heating linearly the bent portions of the superimposed sheets from the outer side thereof in a direction of thickness to thereby fusion-weld said bent portions in which the bending means may be, for example, rod-shaped or wedge-shaped and the bending means may be, for example, a pair of star-shaped gear ribbed rolls capable of rotating engaged with each other.

Said bending means may be provided with a heater capable of heating at least the front end of the bending means.

Said heating means may be positioned at a distance corresponding to the bent width of the pleat, and said heating means may be heating plates.

DESCRIPTION OF THE PREFERRED EMBODIMENTS

Figure 1:
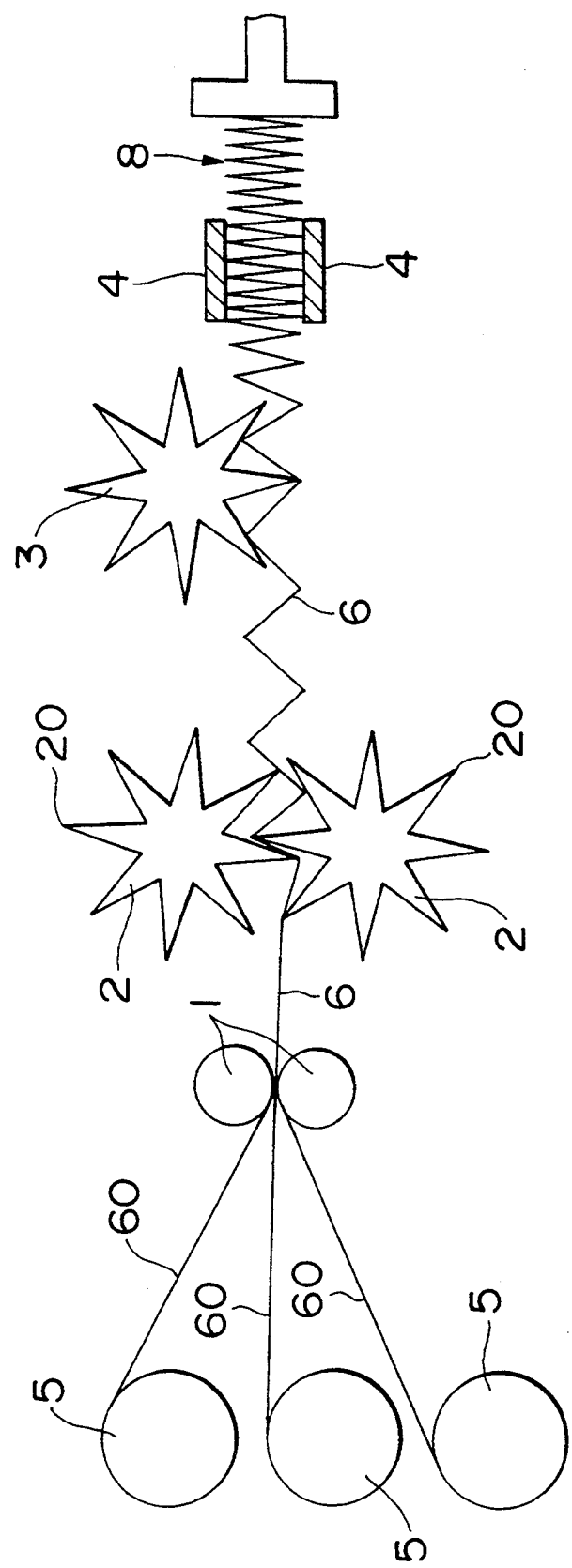
FIG. 1 is a schematic view of a filter manufacturing device according to the present invention.

The filter according to the present invention does not decrease the effective filtering area in the form of a pleat since the filter is fusion-welded only at the top portions of the mountains and the bottom portions of the valleys both of which portions do not substantially affect on the filtering area. Thus, the filter can decrease the air-permeating resistance while preventing deterioration of the collecting capacity. Further, the portions other than the top and bottom portions are never bonded, so that a considerable amount of voids are generated between the filter material sheets to increase the storage capacity of the filter material sheets for dusts.

In addition, in the case of the electret filter material, it can minimize a heat-hysteresis so as to hold high filtering properties.

There are various devices for manufacturing the filter according to the present invention. In one preferred embodiment, the device comprises superimposing and feeding means for superimposing at least two filter material sheets and feeding the superimposed sheets in a predetermined direction, and heating and bending means positioned on both side of the fed superimposed sheets for heating the superimposed sheets by means of for example, a rod or wedge-shaped heater while advancing and retreating toward the superimposed sheets to bend the same in the form of a pleat. In the device of this type, the heating and bending means advances toward the superimposed sheets to bend the same in the form of a pleat while heating linearly the bent portions corresponding to both the top portions of the mountains and the bottom portions of the valleys of the superimposed sheets in a direction of thickness from the inner side thereof to thereby fusion-weld the bent portions.

In another preferred embodiment, the device according to the present invention comprises superimposing and feeding means for superimposing at least two monolayer sheets and feeding the superimpose sheets in a predetermined direction; and, as heating and bending means, a pair of star-shaped gear rolls (ribbed rolls) positioned on both sides of the superimposed sheets so as to be opposed and engaged with each other through the superimposed sheets, the depth or height of the gear portion of said roll being identical to the bent width between one bent portion and the adjacent bent portion thereto and at least the front end of the gear portion of said roll being heated, for example, by a heater provided in the roll. The device of this type bend the superimposed sheets in the form of a pleat while heating and linearly the bent portions, namely both the top portions of the mountains and the bottom portions of the valleys from the inner side of the superimposed sheets to fusion-weld the same with the heated front end of the gear by rotating the rolls.

In still another embodiment, the device according to the present invention comprises superimposing and feeding means for superimposing at least two monolayer sheets and feeding the superimposed sheets in a predetermined direction; bending means, for example, rod or wedge-shaped bending means and star-shaped gear roll (ribbed roll) type bending means in which the gears rotate; engaged with each other, positioned on both sides of the superimposed sheets for advancing and retreating toward the superimposed sheets to bend the same in the form of a pleat; and heating means positioned on the bent superimposed sheets having a pleat of a predetermined width for heating the bent portions, namely both the top portions of the mountains and the bottom portions of the valleys from the outer side of the laminate to thereby fusion-weld the bent portions.

In the device of the present invention, bending means preferably provide also with heating means capable of heating at least the front end of the bending means which front end is contacted with the superimposed sheets when the bending means advanced. In this case, the bent portions of the bent superimposed sheets are first heated and fusion-welded from the inner side by the bending means and then are heated and fusion-welded from the outer side thereof by the heating means whereby the adhesion of the welded portions are improved.

In the device of the present invention, preferable heating means are positioned at a distance corresponding to the bent width of a pleat. The bent superimposed sheets having a predetermined bent width is passed through or pushed between the heating means, whereby the bent portions of the superimposed sheets are heated and fusion-welded.

However, in the case of composing electret filter material sheets and bending the resulting electret composite sheet to pleat the same, the above-mentioned heating means used in the device should be set at temperatures such that the electric charge of the electret superimposed sheets does not reduce or extinguish. Referring to FIG. 1, an example of filter manufacturing device according to the present invention comprises pinch rolls 1,1; star-shaped gear-like ribbed rolls 2,2 in which the gears are engaged with each other and has depth or height slightly larger than the bent width (the width of bent portions) of the pleat of a superimposed sheets 6 composed of a laminate of filter material sheets 60; a star-shaped gear type bending roll 3 for bending the superimposed sheets 6 in the form of a pleat; and heating plates 4,4 positioned, opposed with each other, at a distance corresponding to the bent width, the ribbed rolls 2,2 and the heating plates 4,4 being respectively designed to be heated at temperatures suitable to fusion-weld the superimposed sheets 6 by means of steam, heated oil or electric heater.

The device of the present invention is constituted as above, in which a process for composing filter material sheets and a process for bending the composite sheet in the form of a pleat are carried out as follows:

The filter material sheets 60, 60, 60 each are fed from reels 5,5,5, respectively, by means of the pinch rolls 1,1. The fed filter material sheets are superimposed with each other to produce superimposed sheets 6. The superimposed sheets 6 is sent to ribbed rolls 2,2, where the superimposed sheets 6 is linearly heated and fusion-welded at the front ends 20, 20 of the gears of the ribbed rolls 2,2 in a direction perpendicular to the sending direction of the resulting composite sheet 6. Then, the composite sheet 6 from the ribbed rolls 2,2 is further bent by the bending roll 3 and pushed so as to be substantially folded between the heating plates 4,4, where the bent portions of the composite sheet 6 are linearly heated and fusion welded from the outer side and then are pushed out continuously from the heating plates 4,4.

Figure 2:
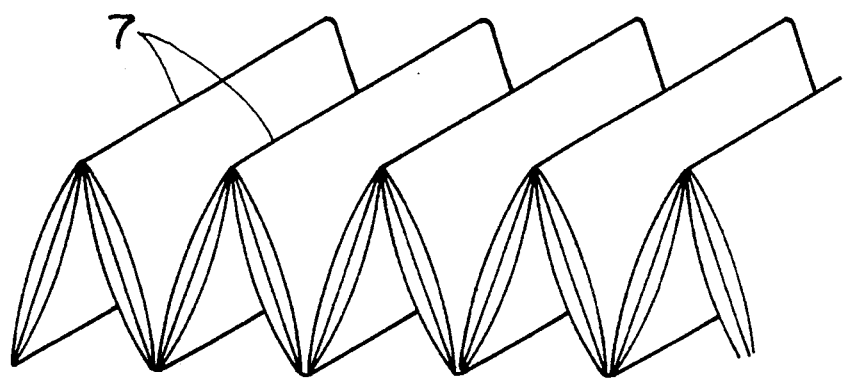
FIG. 2 is a perspective view of a filter according to the present invention.

Referring now to FIG. 2, a filter 8 is shown which is manufactured by using the above mentioned device according to the present invention, in which 7 denotes the welded portions.

EXAMPLE

An electret filter material sheet A prepared by means of a melt-blowing method was applied to the device illustrated in FIG. 1 at a temperature of the ribbed rolls 2 of 80° C. and temperature of the heating plates 4 of 100° C. The electret filter material sheet A was interposed between other filter material sheets B obtained by means of a span bonding method. The sheets B have a low fusion point and high rigidity. These sheets were laminated as a three-layered structure to obtain a composite pleat filter of 30 mm in height and 5 mm in pitch.

Comparative Example

A composite sheet was prepared in the same manner as described in Example with the filter material sheets A and B, laminated as a three-layered structure. The laminating was made by using an ultrasonic wave. Then, the same pleat filter as Example was made without using the heating plates 4. The ribbed rolls 2 were used only for sending the sheet without heating the same.

The result is shown below.

TABLE 1

|  | PRESSURE-LOSS (mmH20) | COLLECTING EFFICIENCY (%) | LIFETIME (Hr) |
| --- | --- | --- | --- |
| Example | 2.4 | 75 | 512 |
| Comparative Example | 3.8 | 57 | 395 |

The collecting efficiency and the pressure loss were obtained in a manner described below by using a device illustrated in FIG. 3.

Particles of NaCl were supplied from an aerosol generator 11 (available from Nippon Kagaku Kogyo Co., Ltd.) to a chamber 12 with a purified air. The diameter of the particles was $0.3\mu$.

A blower 13 was operated after the contents of the chamber 12 had a constant concentration of 2 to $6 \times 10^6$ per CF. When the particle velocity was constant at 50 cm per second, the concentration of the NaCl particle was determined at the upstream and downstream of an electret filter 14. The determination of the particle concentration was made by using the particle counter KC-OIB15 sold by Rion Corporation. The collecting efficiency E was calculated according to the following equation 1.

Collecting efficiency=$(1 - Cout/Cin) \times 100$ (%)

In addition, the pressure loss $\Delta P$ was determined at the upstream and downstream of the filter 14 at the velocity 50 cm per second by using an electronic differential pressure counter sold by Yamatake-Hanewell Co., Ltd.

The lifetime was determined by an accelerated testing with the fly ash (the particle diameter of 3 to $5\mu$).

Figure 3:
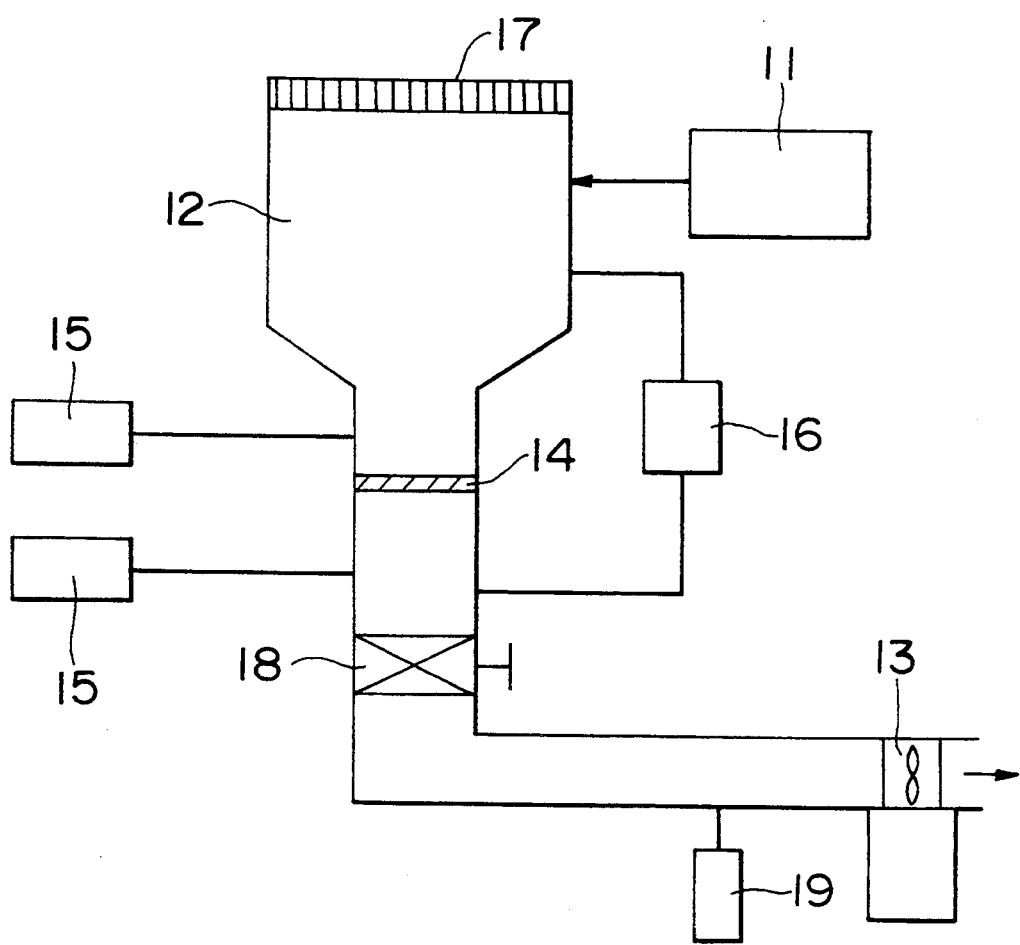
FIG. 3 is a schematic view of a device for use in testing the pressure loss and the collecting efficiency.

In FIG. 3, reference numerals 17 and 18 represent a clean air filter and an air flow adjusting valve, respectively. In addition, a reference numeral 19 represents an anemometer.

As mentioned above, the filter composed of a composite sheet according to the present invention is fusion-welded only at the tops of the mountains and the bottoms of the valleys of the bent portions thereof on which an effective filtering area is not substantially affected. Thus, the filter can decrease the air-permeating resistance while preventing deterioration of the collecting capacity. Further, an air-containing layer (voids) between each laminated portions other than the bent portions contribute to increasing the collecting capacity and of lifetime of the filter.

In addition, in the case of the electret filter material, it can minimize a heat-hysteresis so as to hold high filtering properties.

According to the filter manufacturing device, in which heating means can use also as bending means, or the filter manufacturing device having a star geared roll that acts as the heating portion, it is possible to simultaneously carry out a process for composing filter material sheets, and a process for bending the resulting composite sheet in the form of a pleat. According to the filter manufacturing device including bending means and heating means, it can continuously carry out the manufacture of the filter in a series of processes to thereby improve working efficiency and decrease manufacturing cost.

In case of the latter device in which bending means can use also as heating means, both the top portions of the mountains and the bottom portions of the valleys of the composite sheet are heated and fusion-welded from the inner and outer sides thereof whereby the adhesion of the welded portions are improved. Additionally, in the latter device in which heating plates are used as the heating means, the structure of the device is simplified since the heating plates are simply fixed and the bent portions are securely fusion-welded since the heating plates functions as a guide for the pleated composite sheet.

We claim:
1. A device for manufacturing a filter comprising:
   (a) superimposing and feeding means for superimposing at least two monolayer sheets and feeding the superimposed sheets in a predetermined direction;
   (b) heating and bending means, comprised of a pair of star shaped gear ribbed rolls, one star shaped roll positioned on one side of the fed superimposed sheets and the other star shaped roll positioned on the opposite side of the fed superimposed sheets so as to be opposed and engaged with each other through the fed superimposed sheets, for bending the fed superimposed sheets in the form of a pleat while heating the bent portions of the sheets from the inner side thereof in a direction of thickness so as to be bent easily and transferring the bent superimposed sheets as they are, in said predetermined direction, the depth or height of the gear portion of each roll being identical to a distance between a bent portion and an adjacent bent portion and the front end of the gear portion of said roll being heated by a heater provided in the roll;

(c) bending means, comprised of a single star shaped gear ribbed roll having substantially the same size and shape as said heating and bending means (b), which is positioned downstream with respect to the transferring bent superimposed sheets, for further bending the bent superimposed sheets in the form of a pleat by pushing the same as to be substantially folded and transferring the folded superimposed sheets as they are, in said predetermined direction; and (d) heating means, comprised of a pair of heating plates, one of said heating plates positioned on one side of the transferring folded superimposed sheets and the other of said heating plates positioned on the opposite side of the transferring folded superimposed sheets, for heating linearly only each of the bent portions of the superimposed sheets from the outer side thereof in a direction of thickness to thereby fusion-weld only said bent portions.

* * * * *